(12) United States Patent
Lee et al.

(10) Patent No.: US 9,168,926 B2
(45) Date of Patent: Oct. 27, 2015

(54) DRIVING CONCENTRATION LEVEL CALCULATING APPARATUS AND METHOD, AND SYSTEM AND METHOD FOR WARNING OF VEHICLE COLLISION USING THE SAME

(71) Applicant: Hyundai Motor Company, Seoul (KR)

(72) Inventors: Cheol Ha Lee, Gyeonggi-do (KR); Seong Su Im, Gyeonggi-do (KR); Byung Yong You, Gyeonggi-do (KR); Seok Youl Yang, Incheon (KR)

(73) Assignee: Hyundai Motor Company, Seoul (KR)

( * ) Notice: Subject to any disclaimer, the term of this patent is extended or adjusted under 35 U.S.C. 154(b) by 54 days.

(21) Appl. No.: 14/103,334

(22) Filed: Dec. 11, 2013

(65) Prior Publication Data

US 2015/0066347 A1  Mar. 5, 2015

(30) Foreign Application Priority Data

Sep. 3, 2013  (KR) .......................... 10-2013-0105440

(51) Int. Cl.
| | | |
|---|---|---|
| *G06F 17/10* | (2006.01) | |
| *B60W 40/09* | (2012.01) | |
| *B60W 30/095* | (2012.01) | |
| *B60W 50/14* | (2012.01) | |
| *B60W 50/00* | (2006.01) | |

(52) U.S. Cl.
CPC ........... *B60W 40/09* (2013.01); *B60W 30/0953* (2013.01); *B60W 50/14* (2013.01); *B60W 2050/0059* (2013.01); *B60W 2050/143* (2013.01); *B60W 2520/105* (2013.01); *B60W 2550/302* (2013.01)

(58) Field of Classification Search
CPC . B60W 40/09; B60W 30/0953; B60W 50/14; B60W 2050/143
USPC ........................................ 701/301, 36, 93, 96
See application file for complete search history.

(56) References Cited

U.S. PATENT DOCUMENTS

| | | | |
|---|---|---|---|
| 2007/0021876 A1 | 1/2007 | Isaji et al. | |
| 2008/0004807 A1* | 1/2008 | Kimura et al. ................ | 701/301 |
| 2012/0323474 A1* | 12/2012 | Breed et al. ................... | 701/117 |

FOREIGN PATENT DOCUMENTS

| | | |
|---|---|---|
| JP | 2005-010893 A | 1/2005 |
| JP | 2009-093561 A | 4/2009 |
| KR | 10-2006-0117244 A | 11/2006 |
| KR | 10-2008-0052739 A | 6/2008 |
| KR | 10-2011-0059171 A | 6/2011 |
| KR | 10-2011-00118942 A | 11/2011 |
| KR | 10-2013-0017728 A | 2/2013 |

* cited by examiner

*Primary Examiner* — Thomas G Black
*Assistant Examiner* — Luke Huynh
(74) *Attorney, Agent, or Firm* — Mintz Levin Cohn Ferris Glovsky and Popeo, P.C.; Peter F. Corless

(57) ABSTRACT

A driving concentration level calculating apparatus is provided and includes a controller configured to acquire an acceleration of a traveling vehicle and measure a relative velocity to a preceding vehicle. In addition, noise is removed from the acquired acceleration of the traveling vehicle and from the measured relative velocity to the preceding vehicle. A plurality of correlation values are calculated based on the acceleration of the traveling vehicle and the relative velocity to the preceding vehicle from which noise has been removed. In addition, the controller is configured to detect a time at which a maximum correlation value is calculated as a driving concentration level from among the calculated correlation values.

13 Claims, 6 Drawing Sheets

DRIVING CONCENTRATION LEVEL CALCULATING APPARATUS AND METHOD, AND SYSTEM AND METHOD FOR WARNING OF VEHICLE COLLISION USING THE SAME

CROSS-REFERENCE TO RELATED APPLICATION

This application is based on and claims priority from Korean Patent Application No. 10-2013-0105440, filed on Sep. 3, 2013 in the Korean Intellectual Property Office, the disclosure of which is incorporated herein in its entirety by reference.

BACKGROUND

1. Field of the Invention

The present invention relates to a driving concentration level calculating apparatus and method, and a system and a method for warning of a vehicle collision using the driving concentration level calculating apparatus. More particularly, the present invention relates to adjusting the timing of a collision warning taking into account a driver's driving concentration level when a time to collision inverse (TTCi) exceeds a threshold value.

2. Description of the Prior Art

Nowadays, with the aid of information and communication technologies, vehicles have been developed into intelligent vehicles to provide improved safety and convenience. Since these intelligent vehicles require various types of driver input to provide functions to the driver, various types of devices must be operated while driving. Such driver inputs required to provide safety and convenience, however, cause drivers to be distracted, resulting in collisions with a preceding vehicle.

Typically, a collision warning system measures the velocity of the traveling vehicle and the relative speed and relative distance to a preceding vehicle, to warn of a collision with the preceding vehicle. However, since such a collision warning system takes into account surrounding situations only and does not consider a concentration level, it cannot provide the best timing for warning a driver of a collision.

SUMMARY

Accordingly, the present invention provides a driving concentration level calculating apparatus and method for calculating a driving concentration level (e.g., response time) based on the acceleration of a traveling vehicle and the relative velocity to a preceding vehicle. In addition, the present invention provides a driving concentration level-based system and a method for adjusting a time for a collision warning using the calculated driving concentration level.

In one aspect of the present invention, a driving concentration level calculating apparatus may include a plurality of units executed by a controller. The plurality of units may include a network communication unit configured to acquire an acceleration of a traveling vehicle (e.g., a vehicle being driven); a relative information measuring unit configured to measure a relative velocity to a preceding vehicle; a noise removing unit configured to remove noise from the acceleration of the traveling vehicle acquired by the network communication unit and remove noise from the relative velocity to the preceding vehicle measured by the relative information measuring unit; a correlation value calculating unit configured to calculate correlation value based on the acceleration of the traveling vehicle and the relative velocity to the preceding vehicle from which noise has been removed; and a driving concentration level detecting unit configured to detect a time at which a maximum correlation value is calculated as a driving concentration level from among the correlation values calculated by the correlation value calculating unit.

In another aspect of the present invention, a driving concentration level calculating method, may include: acquiring, by a controller, an acceleration of a traveling vehicle; measuring, by the controller, a relative velocity to a preceding vehicle periodically; removing, by the controller, noise from the acceleration of the traveling vehicle and noise from the relative velocity to a preceding vehicle; calculating, by the controller, correlation values based on the acceleration of the traveling vehicle and the relative velocity to the preceding vehicle from which noise has been removed; and detecting, by the controller, a time at which a maximum correlation value is calculated as a driving concentration level from among the calculated correlation values.

In another aspect of the present invention, a system for warning of a vehicle collision based on a driving concentration level, may include: a driving concentration calculating apparatus, executed by a controller, configured to calculate a driving concentration level based on an acceleration of a traveling vehicle and a relative velocity to a preceding vehicle; a TTCi calculating unit executed by the controller and configured to use the relative velocity v and a relative distance d to the preceding vehicle from the driving concentration calculating unit to calculate time to collision inverse (TTCi); a warning determining unit executed by the controller and configured to generate a warning signal when the calculated TTCi is equal to or greater than a first threshold value and the calculated driving concentration level is equal to or greater than a second threshold value; and a warning unit executed by the controller and configured to output a warning sound based on the warning signal from the warning determining unit.

In another aspect of the present invention, a method for warning of a vehicle collision based on a driving concentration level, may include: calculating, by a controller, a driving concentration level based on an acceleration of a traveling vehicle and a relative velocity to a preceding vehicle; calculating, by the controller, time to collision (TTCi) using the relative velocity v and a relative distance d to the preceding vehicle; generating, by the controller, a warning signal when the calculated TTCi is equal to or greater than a first threshold value and the calculated driving concentration level is equal to or greater than a second threshold value; and outputting, by the controller, a warning sound based on the warning signal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
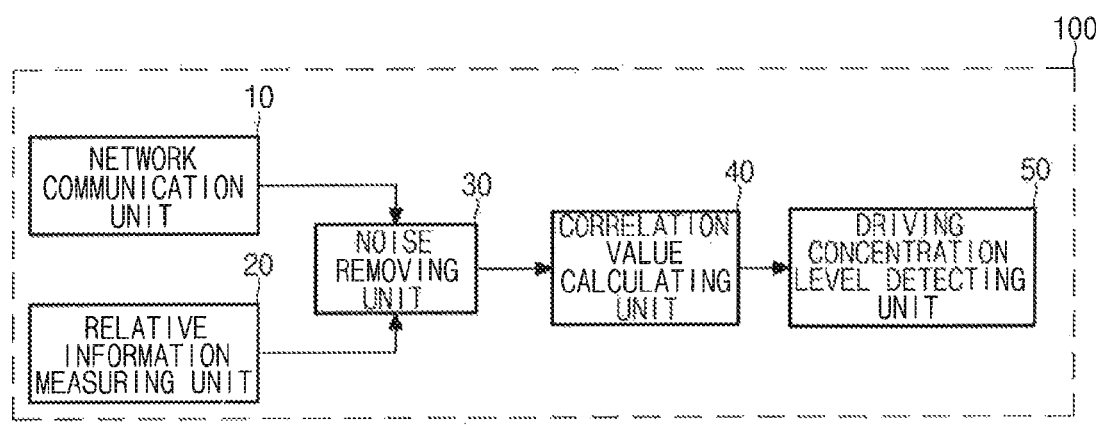
FIG. 1 is an exemplary block diagram of a driving concentration level calculating apparatus according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft: and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplar embodiment is described as using a plurality of units to perform the exemplary process, it is understood that the exemplary processes may also be performed by one or plurality of modules. Additionally, it is understood that the term unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings.

FIG. 1 is an exemplary block diagram of a driving concentration level calculating apparatus for calculating a driving concentration level according to an exemplary embodiment of the present invention. As shown in FIG. 1, the driving concentration level calculating apparatus may include a plurality of units executed by a controller having a processor and a memory. The plurality of units may include a network communication unit 10, a relative information measuring unit 20, a noise removing unit 30, a correlation value calculating unit 40, and a driving concentration level detecting unit 50.

Specifically, the network communication unit 10 may include an interface that connects to a vehicle network to acquire the velocity and acceleration (e.g., longitudinal acceleration) of a traveling vehicle (e.g., a vehicle being driven) via the vehicle network. The expression "a traveling vehicle" refers to a vehicle having the driving concentration level calculating apparatus mounted therein. In addition, the vehicle network may include a controller area network (CAN), a local interconnect network (LIN), a FlexRay, a media oriented system transport (MOST) and the like.

The relative information measuring unit 20 may include, for example, radio detecting and ranging (RADAR) to periodically measure a relative velocity and a relative distance to a preceding vehicle. In particular, measuring a relative velocity and a relative distance to a preceding vehicle using RADAR is well known in the art and, therefore, detailed description thereon will not be given.

The noise removing unit 30 may be implemented, for example, as a low pass filter, and may be configured to remove noise from the velocity and acceleration of the traveling vehicle acquired by the network communication unit 10 and remove noise from the relative velocity and relative distance of the preceding vehicle measured by the relative information measuring unit 20. In addition, the correlation value calculating unit 40 may be configured to calculate correlation values based on the acceleration of the traveling vehicle and the relative velocity of the preceding vehicle from which noise has been removed by the noise removing unit 30.

Figure 2:
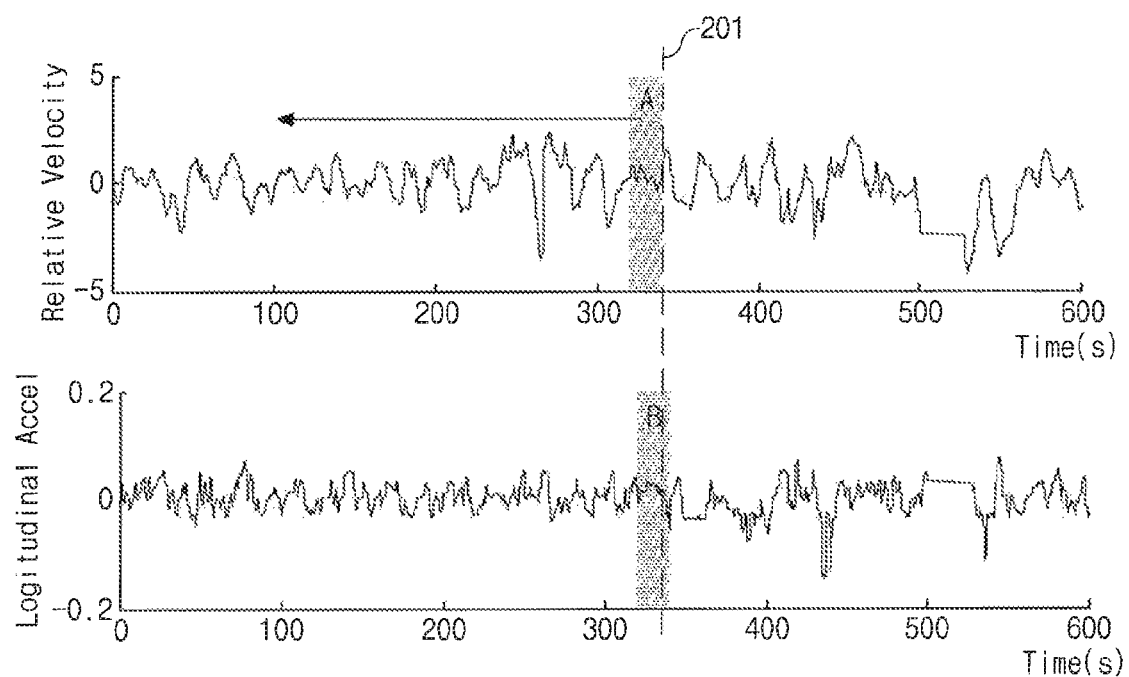
FIG. 2 is an exemplary graph illustrating the process of calculating correlation values according to an exemplary embodiment of the present invention.

Referring now to FIG. 2, it will be described how the correlation value calculating unit 40 calculates correlation values. In FIG. 2, the upper graph shows relative velocity to a preceding vehicle versus time and the lower graph shows longitudinal acceleration of its own graph versus time.

Initially, windows A and B may be set for the relative velocity and the acceleration, respectively, having a range of about 200 ms from the current time point 201 in the past direction (e.g., in the direction indicated by the arrow). Hereinafter, "A" is referred to as a relative velocity window and "B" is referred to as an acceleration window. Then, the correlation value $\gamma_{xy}$ may be calculated using Equation 1 below.

$$\gamma_{xy} = \frac{\sum_{i=0}^{n}(x_i - \bar{x})(y_i - \bar{y})}{(n-1)s_x s_y} \qquad \text{Equation 1}$$

wherein x denotes acceleration, y denotes relative velocity, $\bar{x}$ denotes the average of x, $\bar{y}$ denotes the average of y, $s_x$ denotes the standard deviation of x, and $s_y$ denotes the standard deviation of y.

Then, the relative velocity window A may be moved in the past direction by about 100 ms while the acceleration window B may remain fixed, and a correlation value may be calculated again. Thus, correlation values may be calculated until about 5 seconds (5000 ms) before the current time point 201. In particular, 5 seconds are merely an example, and may be changed as a designer intends.

The driving concentration level detecting unit 50 may be configured to detect a moving time (e.g., a driver's response time) of a relative velocity window (A) in which a maximum correlation value may be calculated as the driving concentration level of a driver, among correlation values calculated by the correlation value calculation unit 40. In other words, the translation time of the relative velocity window (A) in which the maximum correlation value may be calculated represents a response time of a driver and thus the driver's driving concentration level.

For example, under an assumption that a correlation value calculated based on the relative velocity window A and the acceleration window B at the current time point 201 is about 0.1, a correlation value calculated after the relative velocity window A has been moved in the past direction by about 100 ms is about 0.1, a correlation value calculated after the relative velocity window A has been moved in the past direction by about 200 ms is about 0.2, a correlation value calculated after the relative velocity window A has been moved in the past direction by about 300 ms is about 0.2, a correlation value calculated after the relative velocity window A has been moved in the past direction by about 400 ms is about 0.3, a correlation value calculated after the relative velocity window A has been moved in the past direction by about 500 ms is about 0.5, and all correlation values sequentially calculated until the relative velocity window A has been moved in the past direction by about 5000 ms are about 0.1. In particular, the correlation value may have the maximum value when the relative velocity window A is moved in the past direction by about 500 ms. Accordingly, about 500 ms indicating the translation time of the window A may be the response time of the driver.

Figure 3:
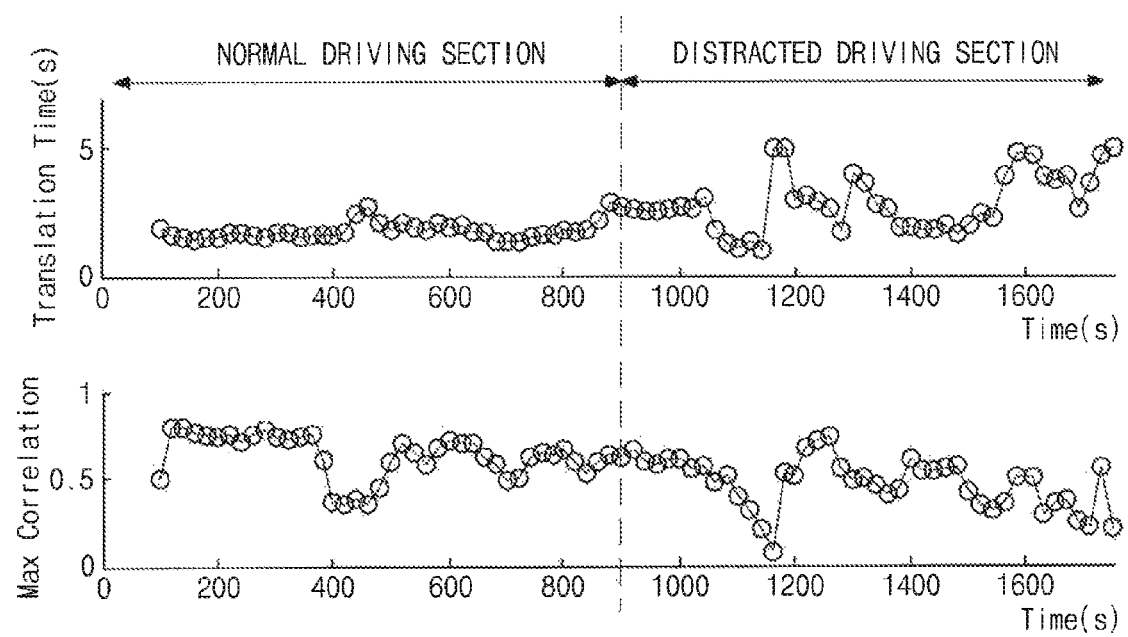
FIG. 3 an exemplary graph illustrating a calculated driving concentration level according to an exemplary embodiment of the present invention.

Further, the maximum correlation value Max Correlation thus calculated and the translation time Translation Time of a corresponding relative velocity window A may be calculated periodically (e.g., 0.1 second to 1 second), and the result is shown in FIG. 3. As shown in FIG. 3, when the translation time of the relative velocity window A that corresponds to the maximum correlation value has a substantially low value (e.g., 3 seconds or less) and has substantially low variation, a normal driving section (e.g., an undistracted section) may be determined. When the translation time of the relative velocity window A that corresponds to the maximum correlation value has a substantially large variation, a distracted driving section may be determined.

Figure 4:
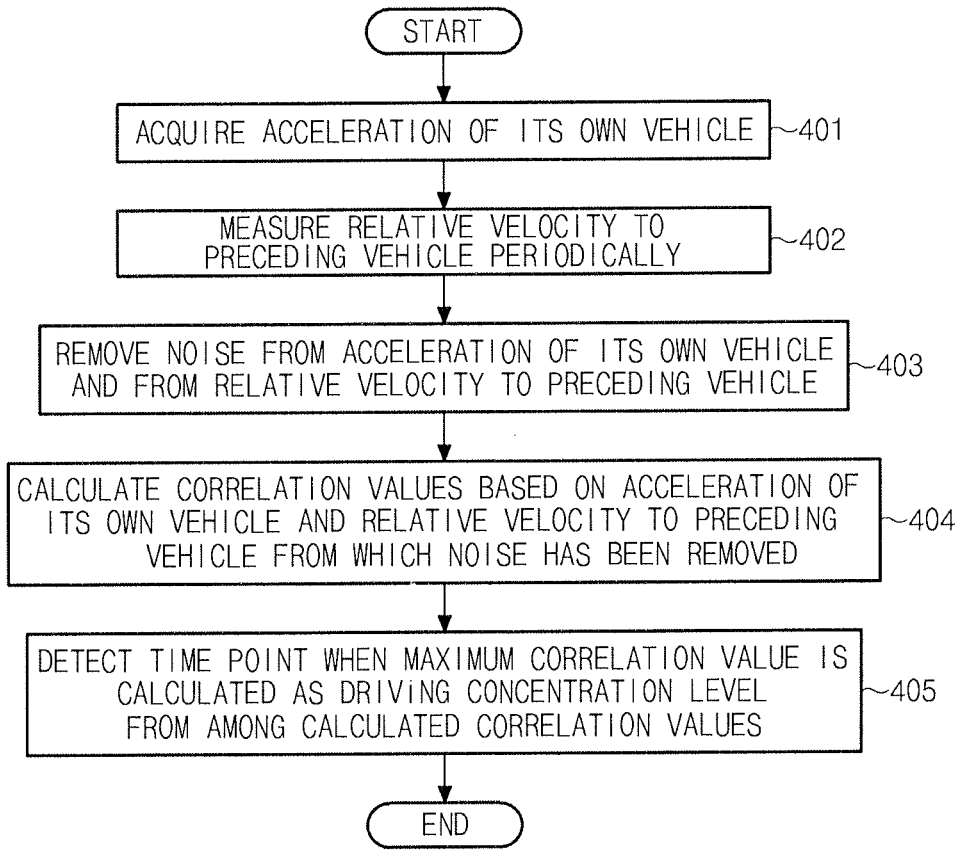
FIG. 4 is an exemplary flow chart illustrating a method for calculating a driving concentration level according to an exemplary embodiment of the present invention.

FIG. 4 is an exemplary flow chart illustrating a method for calculating a driving concentration level according to an embodiment of the present invention.

Initially, a network communication unit 10 may be configured to acquire the acceleration of a traveling vehicle (401). Then, a relative information measuring unit 20 may be configured to periodically measure the relative velocity to a preceding vehicle (402). A noise removing unit 30 may be configured to remove noise from the acceleration of the traveling vehicle and remove noise from the relative velocity to the preceding vehicle (403). Further, a correlation value calculating unit 40 may be configured to calculate correlation values based on the acceleration of the traveling vehicle and the relative velocity of the preceding vehicle from which noise has been removed (404). A driving concentration level detecting unit 50 may be configured to detect a time when a maximum correlation value is calculated as the driving concentration level from among the calculated correlation values.

Figure 5:
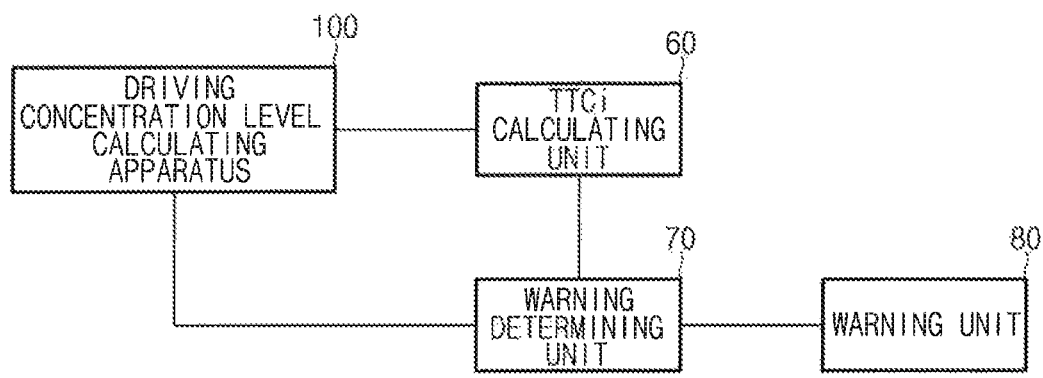
FIG. 5 is an exemplary block diagram showing a collision warning system based on the driving concentration level according to an exemplary embodiment of the present invention.

FIG. 5 is an exemplary block diagram showing a system for warning of a vehicle collision based on the driving concentration level according to an exemplary embodiment of the present invention. As shown in FIG. 5, a system for warning of a vehicle collision based on the driving concentration level may include a driving concentration level calculating apparatus 100, a time-to-collision-inverse (TTCi) calculating unit 60, a warning determining unit 70, and a warning unit 80, wherein the apparatus and the plurality of units are executed by a controller.

Specifically, the driving concentration level calculating apparatus 100 may be configured to calculate a driver's driving concentration level (e.g., response time) through the processes described above. Further, the TTCi calculating unit 60 may be configured to calculate a TTCi using the relative velocity v and relative distance d to a preceding vehicle measured by a relative information measuring unit 20 of the driving concentration level calculating apparatus 100. In particular, the TTCi calculating unit 60 may be configured to calculate the TTCi using Equation 2 below.

$$TTCi = \frac{v}{d} \qquad \text{Equation 2}$$

Additionally, the warning determining unit 70 may be configured to generate a warning signal when the TTCi calculated by the TTCi calculating unit 60 is equal to or greater than about 0.1 and the driving concentration level calculated by the driving concentration level calculating apparatus 100 is equal to or greater than about 3 seconds. The warning unit 80 may be configured to output a warning sound based on the warning signal from the warning determining unit 70.

Figure 6:
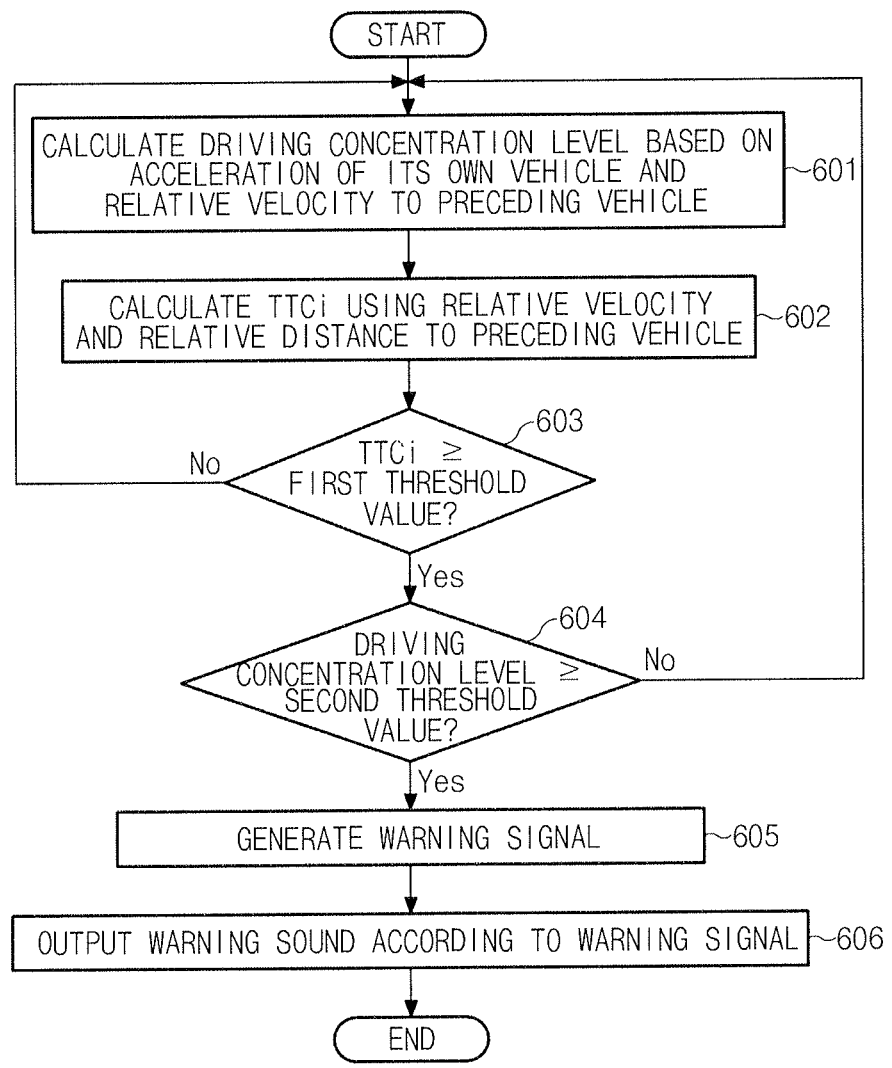
FIG. 6 is an exemplary flow chart illustrating a method for warning of a vehicle collision based on the driving concentration level according to an exemplary embodiment of the present invention.

FIG. 6 is an exemplary flow chart illustrating a method for warning of a vehicle collision based on the driving concentration level according to an exemplary embodiment of the present invention.

Initially, a driving concentration level calculating device 100 may be configured to calculate a driving concentration level based on the acceleration of a traveling vehicle and the relative velocity of a preceding vehicle (601). Further, a time-to-collision-inverse (TTCi) calculating unit 60 may be configured to calculate a TTCi using the relative velocity v and the relative distance to the preceding vehicle (602). A warning determining unit 70 may be configured to calculate whether the calculated TTCi is equal to or greater than a first threshold value (603).

When the calculated TTCi is less than the first threshold value as a result of the determination 603, the process may process to operation 601. When the calculated TTCi is equal to or greater than the first threshold value as a result of the determination 603, the calculated driving concentration level is determined to be equal to or greater than a second threshold value (604). In addition, when the calculated TTCi is less than the first threshold value as a result of the determination 604, the process may proceed to operation 601. When the calculated TTCi is equal to or greater than the second threshold value as a result of the determination 604, a warning signal may be generated (605). Then, a warning unit 80 may be configured to output a warning sound based on the warning signal (606).

According to the exemplary embodiments of the present invention, when a time to collision inverse (TTCi) exceeds a threshold value, the time for warning a driver of a collision with a preceding vehicle may be adjusted by taking into account the driver's driving concentration level, to warn the driver in a timely manner prior to the collision.

What is claimed is:

1. A driving concentration level calculating apparatus comprising:
   a memory configured to store program instructions; and
   a processor configured to execute the program instructions, the program instructions when executed configured to:
   acquire an acceleration of a traveling vehicle;
   measure a relative velocity to a preceding vehicle;
   remove noise from the acquired acceleration of the traveling vehicle;
   remove noise from the measured relative velocity to the preceding vehicle;
   calculate correlation values based on the acceleration of the traveling vehicle and the relative velocity to the preceding vehicle from which noise has been removed; and
   detect a time at which a maximum correlation value is calculated as a driving concentration level from among the calculated correlation values,
   wherein the correlation values are calculated by setting a relative velocity window and an acceleration window for the relative velocity of the preceding vehicle and the acceleration of the traveling vehicle, respectively, wherein the relative velocity window and the acceleration window having substantially the same time range with respect to a current time point, and by moving the relative velocity window to a past direction by unit time to calculate the correlation values sequentially, with the acceleration window fixed.

2. The driving concentration level calculating apparatus according to claim 1, wherein the time range is set to be greater than the unit time to create overlapping areas when the correlation values are calculated.

3. The driving concentration level calculating apparatus according to claim 1, wherein the program instructions when executed are further configured to:
   calculate the correlation values from the current time point to a predetermined time point in the past.

4. The driving concentration level calculating apparatus according to claim 1, wherein the correlation values $\gamma_{xy}$ are calculated using:

$$\gamma_{xy} = \frac{\sum_{i=0}^{n}(x_i - \bar{x})(y_i - \bar{y})}{(n-1)s_x s_y}$$

wherein x denotes acceleration, y denotes relative velocity, $\bar{x}$ denotes average of x, $\bar{y}$ denotes average of y, $s_x$ denotes standard deviation of x, and $s_y$ denotes standard deviation of y.

5. A driving concentration level calculating method, comprising:
   acquiring, by a controller, an acceleration of a traveling vehicle;
   measuring, by the controller, a relative velocity to a preceding vehicle periodically;
   removing, by the controller, noise from the acceleration of the traveling vehicle and noise from the relative velocity to a preceding vehicle;
   calculating, by the controller, correlation values based on the acceleration of the traveling vehicle and the relative velocity to the preceding vehicle from which noise has been removed; and
   detecting, by the controller, a time at which a maximum correlation value is calculated as a driving concentration level from among the calculated correlation values,
   wherein the calculating of the correlation values includes:
   setting, by the controller, a relative velocity window and an acceleration window for the relative velocity of the preceding vehicle and the acceleration of the traveling vehicle, respectively, wherein the relative velocity window and the acceleration window having substantially the same time range with respect to a current time point; and
   moving, by the controller, the relative velocity window in a past direction by unit time to calculate the correlation values sequentially, with the acceleration window fixed.

6. The driving concentration level calculating method according to claim 5, wherein the time range is set to be greater than the unit time to create overlapping areas when the correlation values are calculated.

7. The driving concentration level calculating method according to claim 5, further comprising:
   calculating, by the controller, the correlation values from the current time point to a predetermined time point in the past.

8. The driving concentration level calculating method according to claim 5, wherein the calculating of the correlation values includes calculating the correlation values $\gamma_{xy}$ using:

$$\gamma_{xy} = \frac{\sum_{i=0}^{n}(x_i - \bar{x})(y_i - \bar{y})}{(n-1)s_x s_y}$$

wherein x denotes acceleration, y denotes relative velocity, $\bar{x}$ denotes average of $\bar{y}$ denotes average of y, $s_x$ denotes standard deviation of x, and $s_y$ denotes standard deviation of y.

9. A system for warning of a vehicle collision based on a driving concentration level, comprising:
   a memory configured to store program instructions; and
   a processor configured to execute the program instructions, the program instructions when executed configured to:
   calculate a driving concentration level based on an acceleration of a traveling vehicle and a relative velocity to a preceding vehicle;
   calculate time to collision inverse (TTCi) using the relative velocity v and a relative distance d to the preceding vehicle;
   generate a warning signal when the calculated TTCi is equal to or greater than a first threshold value and the calculated driving concentration level is equal to or greater than a second threshold value; and
   output a warning sound based on the warning signal,
   wherein the program instructions when executed are further configured to:
   acquire an acceleration of the traveling vehicle;
   measure a relative velocity and a relative distance to a preceding vehicle;
   remove noise front the acquired acceleration of the traveling vehicle and remove noise from measured the relative velocity and the relative distance to the preceding vehicle;
   calculate correlation values based on the acceleration of the traveling vehicle and the relative velocity to the preceding vehicle from which noise has been removed; and detect a time at which a maximum correlation value is calculated as a driving concentration level from among the calculated correlation values.

10. The system according to claim 9, wherein the TTCi is calculated using:

$$TTCi = \frac{v}{d}.$$

11. The system according to claim 9, wherein the program instructions when executed are further configured to:
calculate the correlation values by setting a relative velocity window and an acceleration window for the relative velocity of the preceding vehicle and the acceleration of the traveling vehicle, respectively, wherein the relative velocity window and the acceleration window having the same time range with respect to a current time point, and by moving the relative velocity window in a past direction by unit time to calculate the correlation values sequentially, with the acceleration window fixed.

12. The system according to claim 11, wherein the time range is set to be greater than the unit time to create overlapping areas when the correlation values are calculated.

13. The system according to claim 9, wherein the correlation values $\gamma_{xy}$ are calculated using:

$$\gamma_{xy} = \frac{\sum_{i=0}^{n}(x_i - \bar{x})(y_i - \bar{y})}{(n-1)s_x s_y}$$

wherein x denotes acceleration, y denotes relative velocity, $\bar{x}$ denotes average of $\bar{y}$ denotes average of y, $s_x$ denotes standard deviation of x, and $s_y$ denotes standard deviation of y.

* * * * *